(12) United States Patent
Boffi et al.

(10) Patent No.: US 8,380,076 B2
(45) Date of Patent: Feb. 19, 2013

(54) OPTICAL TRANSMISSION SYSTEM WITH OPTICAL CHROMATIC DISPERSION COMPENSATOR

(75) Inventors: Pierpaolo Boffi, Voghera (IT); Giorgio Grasso, Monza (IT); Lucia Marazzi, Borgarello (IT); Paola Parolari, Monza (IT); Aldo Righetti, Milan (IT); Marco Romagnoli, Milan (IT); Giovanni Tamiri, Biassono (IT)

(73) Assignee: Google Inc., Mountain View, CA (US)

( * ) Notice: Subject to any disclaimer, the term of this patent is extended or adjusted under 35 U.S.C. 154(b) by 630 days.

(21) Appl. No.: 12/520,914

(22) PCT Filed: Dec. 27, 2006

(86) PCT No.: PCT/IB2006/003778
§ 371 (c)(1),
(2), (4) Date: Mar. 31, 2010

(87) PCT Pub. No.: WO2008/078130
PCT Pub. Date: Jul. 3, 2008

(65) Prior Publication Data
US 2010/0232802 A1    Sep. 16, 2010

(51) Int. Cl.
*H04B 10/12* (2006.01)
*H04B 10/00* (2006.01)
*H04B 10/02* (2006.01)
*H04J 14/02* (2006.01)

(52) U.S. Cl. .......... 398/147; 398/81; 398/119; 398/136; 398/158; 398/192

(58) Field of Classification Search .................... 398/147
See application file for complete search history.

(56) References Cited

U.S. PATENT DOCUMENTS

| | | | |
|---|---|---|---|
| 6,654,564 B1 * | 11/2003 | Colbourne et al. | 398/147 |
| 6,941,045 B2 * | 9/2005 | Doerr | 385/39 |
| 6,961,492 B2 * | 11/2005 | Doerr | 385/39 |

(Continued)

FOREIGN PATENT DOCUMENTS

EP    1 098 212 A1    5/2001

OTHER PUBLICATIONS

Forestieri, E. et al., "Narrow Filtered DPSK Implements Order-1 CAPS Optical Line Coding", IEEE Photonics Technology Letters, vol. 16, No. 2, Feb. 2004, pp. 662-664.

(Continued)

*Primary Examiner* — Kenneth N Vanderpuye
*Assistant Examiner* — Amritbir Sandhu
(74) *Attorney, Agent, or Firm* — Honigman Miller Schwartz and Cohn LLP

(57) ABSTRACT

An optical transmission system having an optical source, an optical dispersion compensation filter optically connected to the optical source, and a control system. The optical source generates a modulated optical signal having an optical spectrum and a value of dispersion robustness. The optical dispersion compensation filter has at least two cascaded optical resonators and a periodic transfer function rigidly translatable in the frequency spectrum to obtain translation in frequency of the transfer function without a substantial change in shape, and characterized by a free spectral range. The control system acts on the optical dispersion compensation filter in order to rigidly translate the transfer function along the frequency spectrum in first and second positions in the frequency spectrum. The translation of the transfer function between the first and the second positions is smaller than the free spectral range.

20 Claims, 11 Drawing Sheets

U.S. PATENT DOCUMENTS

| | | |
|---|---|---|
| 6,985,660 B2 * | 1/2006 | Koshiba et al. ............... 385/123 |
| 7,061,596 B2 * | 6/2006 | Doerr ............................ 356/73.1 |
| 7,187,868 B2 * | 3/2007 | Carbone et al. ............... 398/150 |
| 7,512,344 B2 * | 3/2009 | Sugawara et al. ............. 398/147 |
| 7,532,789 B1 * | 5/2009 | Doylend ........................ 385/27 |
| 2002/0005970 A1 * | 1/2002 | Lang ............................ 359/161 |
| 2004/0037505 A1 | 2/2004 | Morin |
| 2004/0091223 A1 | 5/2004 | Gorni et al. |
| 2005/0058397 A1 * | 3/2005 | Doerr ............................ 385/39 |
| 2005/0058398 A1 * | 3/2005 | Doerr ............................ 385/39 |
| 2006/0013529 A1 * | 1/2006 | Sugawara et al. ............... 385/27 |
| 2006/0222373 A1 | 10/2006 | Barbarossa et al. |
| 2007/0014515 A1 * | 1/2007 | Sugawara et al. ............... 385/27 |
| 2009/0123165 A1 * | 5/2009 | Hashimoto et al. ........... 398/192 |
| 2010/0266291 A1 * | 10/2010 | Boffi et al. .................... 398/159 |

OTHER PUBLICATIONS

Doerr, Christopher R. et al., "Optical Dispersion Compensator Suitable for Use With Non-Wavelength-Locked Transmitters", Journal of Lightwave Technology, vol. 24, No. 1, Jan. 2006, pp. 166-170.

* cited by examiner

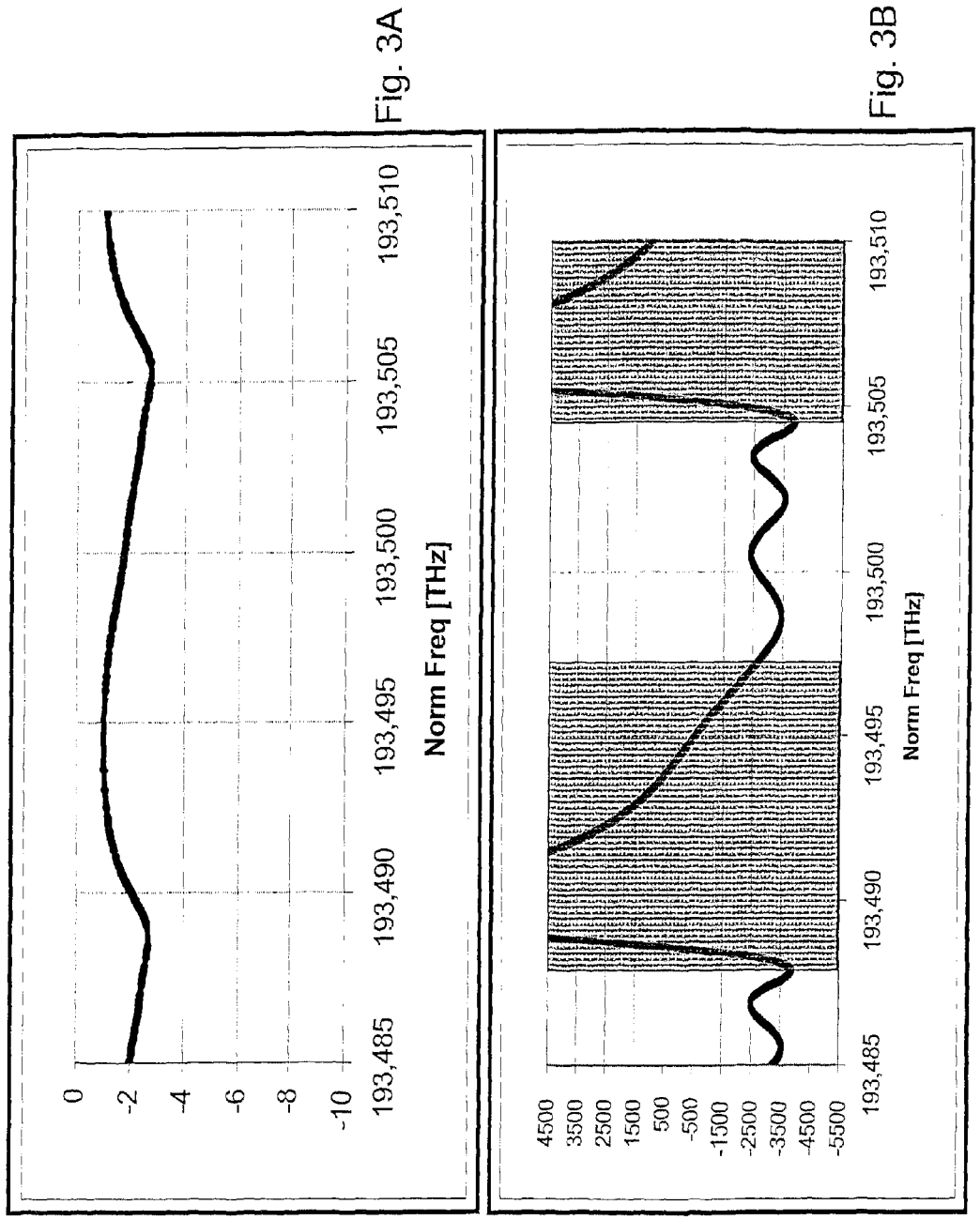

OPTICAL TRANSMISSION SYSTEM WITH OPTICAL CHROMATIC DISPERSION COMPENSATOR

TECHNICAL FIELD OF THE INVENTION

The present invention relates to the field of the optical transmissions comprising an optical filter to compensate for chromatic dispersion.

BACKGROUND ART

The rapid growth in data traffic and bandwidth demand by the final users has led to a growing interest in urban/regional networks constituted by links that are non-compensated in chromatic dispersion on conventional single mode fibres (with dispersion of about 16-17 ps/nmkm). To allow high service flexibility at low costs, the development of urban networks operating in the so-called third window of optical communications (around 1550 nm) at a transmission bit-rate of 10 Gb/s requires the application of new optical solutions relative to those adopted for the transport network.

For example, modulation formats characterized by a narrow frequency spectrum, and hence intrinsically robust with respect to chromatic dispersion, are known.

The robustness of the format is the maximum cumulated chromatic dispersion (corresponding to a maximum distance) for which the optical signal-to-noise ratio OSNR needed to obtain a given BER (Bit Error Rate) performance (e.g., $10^{-6}$ or $10^{-12}$) has to increase by about 1 dB with respect to the quantity needed in back-to-back conditions (connection between transmitter and receiver without chromatic dispersion).

A first example is the use of the Phase Shaped Binary Transmission (PSBT) format, also known as duobinary. Pure duobinary coding entails the generation of a signal at three amplitude levels starting from a two-level NRZ signal through a delay equal to the duration of the bit. Duobinary coding can give rise to high dispersion robustness through the compression of the bandwidth of the modulating electrical signal. Through a single electric filtering stage with cut-off frequency slightly higher than one quarter of the transmission bit-rate and the use of a Mach-Zehnder external optical modulator, duobinary coding without delay lines is obtained. This solution enables transmission at 10 Gb/s on non-compensated links up to distances of about 180-200 km with low penalties.

An additional example is the Combined Amplitude Phase Shift (CAPS) format, as described, e.g. in E. Forestieri, G. Prati, IEEE Photonics Technology Letters, 16, pp. 662-664 (2004). It takes up the advantages of the PSBT duobinary format, achieving the compression of the power, spectrum and the phase shifts by means of a generator of pulses provided with energy even at the "0" and an appropriate coding of the binary sequence. If the signal were zeroed at the "0"s, the CAPS format would coincide with the ideal duobinary. The CAPS format is obtained from the Differential Phase Shift Keying (DPSK) format generated by means of a Mach-Zehnder modulator through a narrow optical filtering. The optimal band-pass optical filter has cut-off frequency at about ⅔ of the transmission bit-rate. Tolerance to chromatic dispersion varies according to the type and the order of the optical filter used and it can reach 180-200 km of non-compensated links.

The described solutions require, for the implementation of the format, use of external modulators, typically electro-optical.

Alternatively, particularly advantageous is the use of directly modulated lasers (DMLs) as transmitters: relative to the use of external Mach-Zehnder or electro-absorption modulators, they offer the advantage of small dimensions, low drive voltages, low cost and high output powers. Unfortunately, the frequency chirp associated with modulation in DMLs significantly limits transmission in links that are not compensated in chromatic dispersion on standard SMF fibres.

In the third window, use of DMLs allows, at a bit-rate of 2.5 Gb/s, acceptable performance up to an accumulated dispersion of about 2000 ps/nm (corresponding to about 120 km of SMF fibre). Although these performance levels are not sufficient for long distance networks, they are acceptable for example for urban networks, also of coarse-wavelength division multiplexed (CWDM) type.

At a bit-rate of 10 Gb/s, use of DMLs limits transmission over conventional fibre (16-17 ps/nm/km) to a maximum of about 10-20 km. A practical, realistic application of DML sources modulated at 10 Gb/s requires solutions that enable chirp effects and hence the bandwidth of the modulated signal to be minimized. Among the methods proposed in the prior art, we find:

- transmission over low dispersion fibres (less than 10 ps/nm/km) or negative dispersion. Use of negative dispersion fibres can compensate the positive chirp that is typical of the DML;
- dispersion-supported transmission (DST) techniques, where the conversion of the optical frequency modulation into intensity modulation is exploited together with an appropriate electric filtering. This solution naturally complicates the structure of the receiver;
- use of a narrow optical filtering downstream of a DML laser (hereinafter referred to as a 'filtered DML'): dispersion robustness is obtained in this case from the particular phase relationship between the adjacent bits resulting from the simultaneous presence of amplitude modulation and frequency modulation. For example, for a sequence at 10 Gb/s, a frequency modulation of 5 GHz is induced by means of the DML chirp, so that to bit "1" is associated a carrier with frequency 5 GHz higher than that of bit "0". The phase of the carrier then increases linearly by $\pi$ during bit "0". In this way, two "1" bits separated by an odd number of "0" bits are in phase opposition. The closing of the eye due to the widening of the bit "1" accumulated by dispersion during the propagation is elided thanks to the destructive interference generated by the phase shift of $\pi$ between the two interacting bits. The narrow optical filtering increases the extinction ratio, converting the residual frequency modulation into intensity in order to optimize performance. Such a solution allows transmission at 10 Gb/s on non-compensated links up to about 150-170 km.

Since dispersion is a linear effect, dispersion compensators—operating as linear filters in the optical domain—may be added to the solutions described above.

For example, optical dispersion compensators (ODC) are optical filters with appropriate phase transfer function and hence appropriate group velocity dispersion which can be inserted in line to compensate dispersion by operating directly on the optical signal. See for example in C. R. Doerr et al., J. Lightwave Technol., 34, pp. 166-170 (2006).

SUMMARY OF THE INVENTION

The Applicant thus confronted the problem of increasing the maximum transmission length of the formats described above, e.g. up to lengths of 300-500 km, with devices that would also be easily adaptable to use over shorter transmission lengths.

The Applicant has considered the possibility of varying dispersion, with a dispersive value that is different and corresponding (equal in absolute value and opposite in sign) to that of the line.

It is a consolidated prejudice in the art that a dispersion compensator filter (ODC) operates correctly when its dispersive characteristic is complementary to that of the fibre to be compensated. Since the chromatic dispersion of the fibre is substantially constant in the region of use (about 0.08 ps/nm² of slope), prior art filters are designed with a substantially flat operative region (trying to minimize the oscillations around the average value). The Applicant has instead discovered that it is advantageous to use the aforesaid ODC filters in the spectral regions whereat the characteristic dispersion curve has an appreciable slope.

Using an optical dispersion compensation filter comprising at least two cascaded optical resonators and having a periodic transfer function that is rigidly translatable in the frequency spectrum, it is possible to obtain the rigid translation in frequency of the transfer function acting on a single control variable (e.g., the temperature of the resonators) making the control algorithm simpler, faster and more reliable.

The present invention, in a first aspect, relates to an optical transmission system comprising:
- an optical source able to generate a modulated optical signal having an optical spectrum and a dispersion robustness;
- an optical dispersion compensation filter optically connected to the optical source, comprising at least two cascaded optical resonators and having a periodic transfer function that is rigidly translatable in the frequency spectrum and characterized by a free spectral range (FSR);
- a control system arranged to act on the optical compensation filter in order rigidly to translate said transfer function along the frequency spectrum in a first and in a second position in such a way that:
  - in a first position in the frequency spectrum of said transfer function, the mean chromatic dispersion weighted over said optical spectrum of the modulated signal is greater, in absolute value, than the value of dispersion robustness;
  - in a second position in the frequency spectrum of said transfer function, the mean chromatic dispersion weighted over said optical spectrum of the modulated signal is smaller, in absolute value, than the value of dispersion robustness;
  - in the first and in the second position the mean slope of the chromatic dispersion weighted over said optical spectrum of the modulated signal is smaller, in absolute terms, than 300000 ps/nm², in which the translation of said transfer function between the first and the second position is smaller than said FSR.

In a second aspect, the present invention relates to an optical telecommunication system comprising a transmission system like the one indicated above, a receiver and an optical line adapted to connect optically the transmission system to the receiver.

In an additional aspect, the present invention relates to a method for transmitting a modulated optical signal having an optical spectrum and a dispersion robustness along an optical line characterized by a dispersion by means of the optical transmission system indicated above. The method comprises:

- choosing one from said first and said second position of the dispersion compensation filter according to the values of dispersion robustness of the modulated optical signal and of the dispersion of the optical line and
- tuning the filter in one of said first and second positions according to said choice.

BRIEF DESCRIPTION OF THE DRAWINGS

The characteristics and the advantages of the present invention shall be readily apparent from the detailed description that follows of one or more embodiments thereof, provided purely by way of non-limiting example. The description shall be provided with reference to the accompanying drawings, in which:

FIGS. 3A and 3B show an example of transfer function respectively in amplitude and in dispersion of a three-ring ODC filter according to the invention;

DETAILED DESCRIPTION OF SOME PREFERRED EMBODIMENTS OF THE INVENTION

Figure 1:
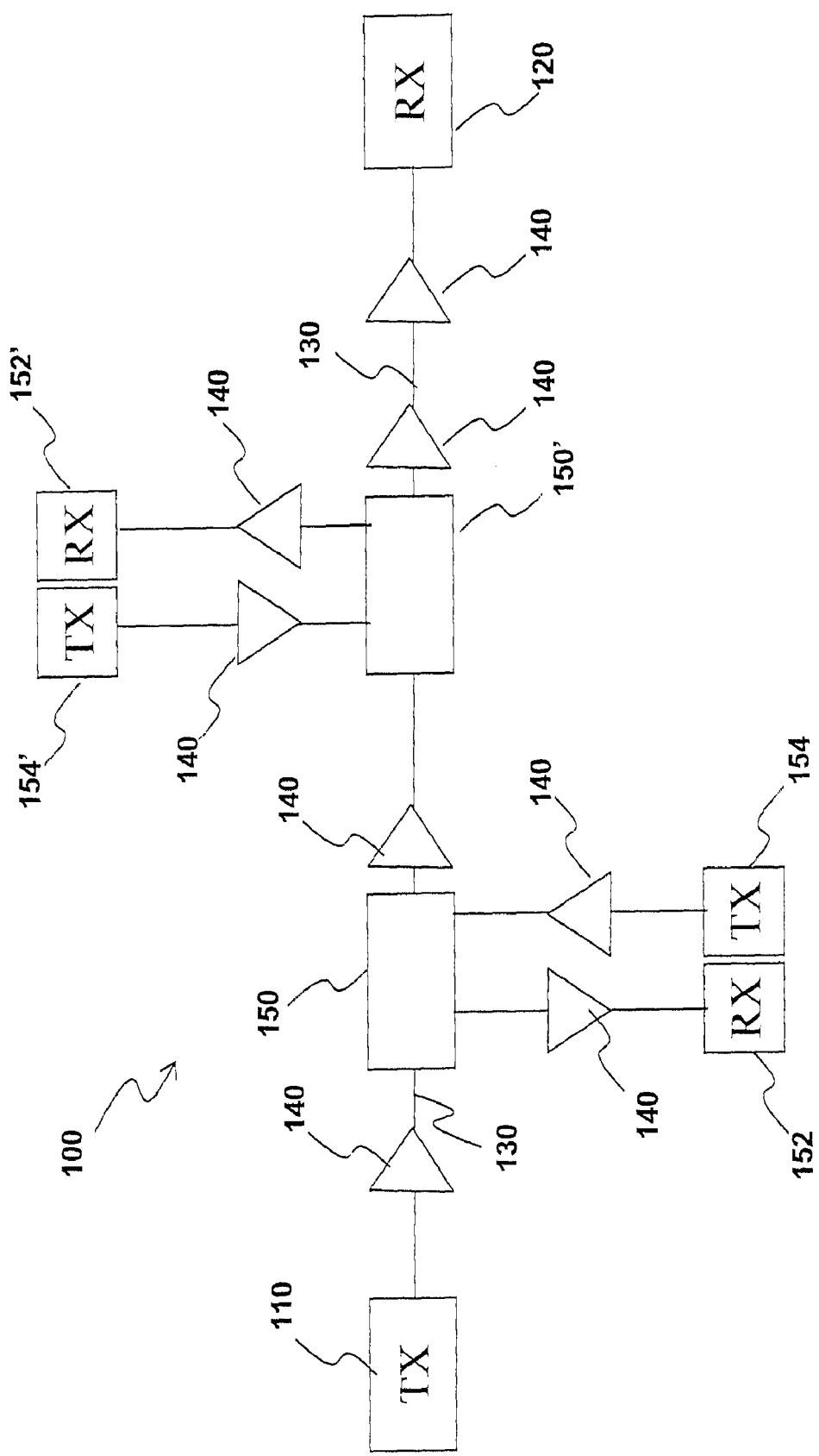
FIG. 1 schematically shows, in terms of function blocks, an example of architecture of optical communication system according to the present invention.

FIG. 1 shows an optical telecommunication system 100 according to an embodiment of the present invention.

The optical telecommunication system 100 comprises at least a transmitter 110, a receiver 120 and an optical line 130 that optically connects the transmitter and the receiver. The transmitter 100 is able to emit an optical signal that transmits information. Preferably, said optical signal comprises a modulated optical radiation, in which said modulation contains the transported information. The wavelength of the optical radiation typically lies in the near infrared, e.g. is between 900 nm and 1700 nm (for example, in the so-called C-band from about 1530 nm to about 1560 nm). Typically, the optical signal is a WDM (wavelength division multiplexing) signal comprising a plurality of optical channels, each allocated on a dedicated wavelength. The receiver 120 is an opto-electronic device able to receive the optical signal emitted by the transmission system and to decode the transported information. The optical line 130 can be formed by a plurality of segments of optical transmission means, such as segments of optical fibre, e.g. cabled.

To enhance the flexibility of the system 100, one or more optical, electronic and/or opto-electronic devices can be provided along the line 130. FIG. 1 shows, by way of example, a plurality of optical amplifiers 140 which may be line amplifiers, power amplifiers ('boosters') or pre-amplifiers. Moreover, by way of example two signal treatment nodes 150 and 150' are shown, optically coupled to the optical line 130 and able to filter or route or drop or regenerate all or part of the optical signal that propagates along the line. In the case of dropping and/or adding of the optical signal, the dropped optical signal can be received and/or transmitted by additional receivers 152, 152' and/or transmitters 154, 154', respectively, which can be co-located with the treatment node or at a certain distance therefrom. Said treatment nodes are particularly useful in the case of WDM signal.

Figure 2:
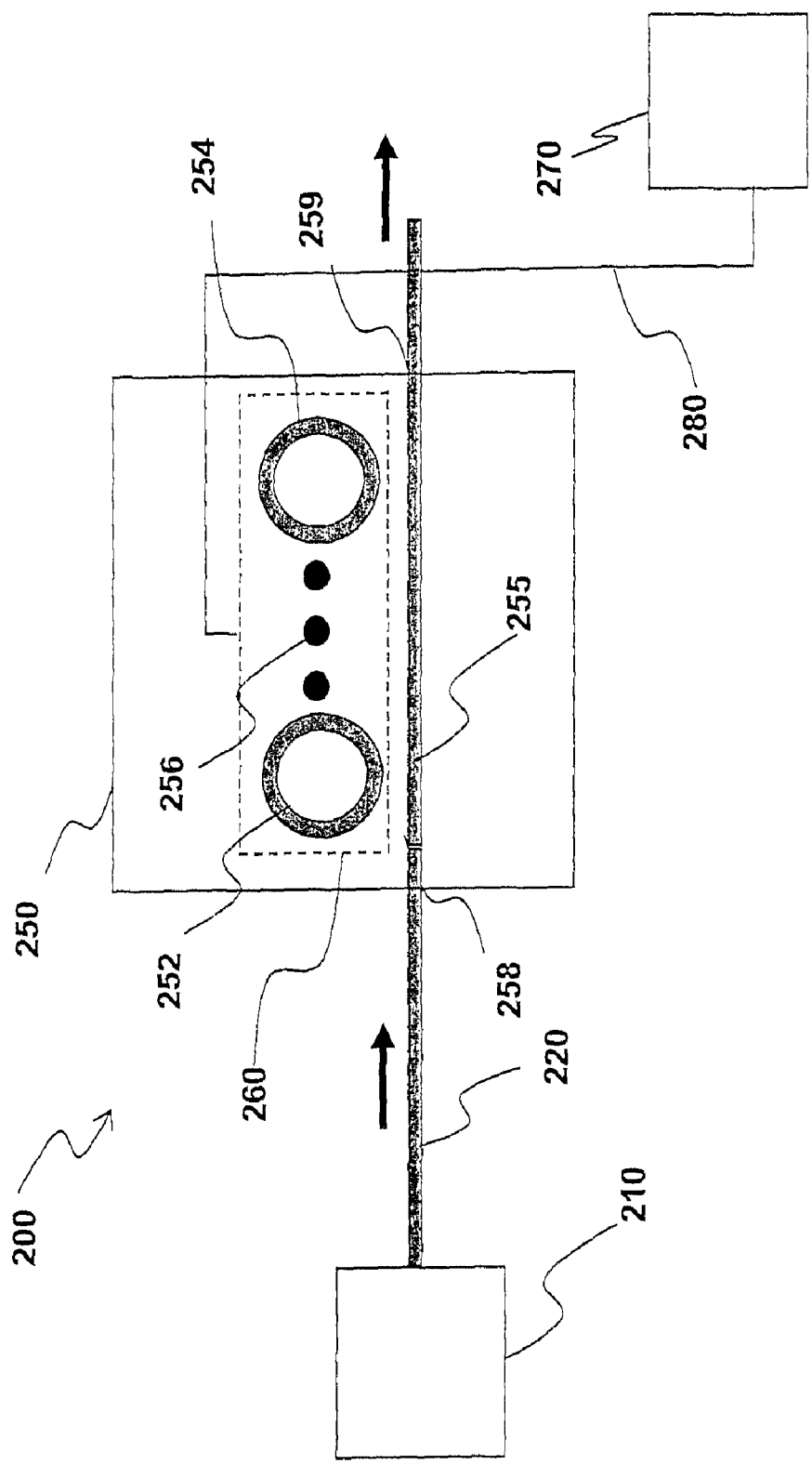
FIG. 2 is a schematic diagram that shows, in terms of function blocks, an exemplary embodiment of a device for optical transmission in accordance with the present invention.

FIG. 2 shows a schematic drawing of a transmission system 200 according to an embodiment of the present invention. The transmission system 200 can be included in the transmitter or in the receiver of FIG. 1. Typically, each optical channel of a WDM signal is transmitted by a dedicated transmission system 200.

The transmission system 200 comprises an optical source 210 able to emit a modulated optical radiation having an optical spectrum, generally designated $P(\omega)$, where $\omega$ is the optical frequency. The shape of the spectrum $P(\omega)$ depends on the specific modulation imparted to the optical signal emitted by the optical source 210. Typically, the spectrum $P(\omega)$ is different from zero only in a band of optical frequencies around a central optical frequency $\omega_0$, substantially coinciding with the optical frequency of the corresponding WDM channel. Depending on the modulation format, as explained above, the optical source 210 can comprise a radiation source (e.g. a laser) and an external optical modulator coupled thereto, or a radiation source and a source actuation device able to modulate the source directly (e.g. in the DML format). The source can also comprise a filter, not shown in the figure, able to give an appropriate shape to the spectrum of the optical signal, such as, in the case of filtered DML format, an optical power filter to reduce the spectrum.

The transmission system 200 further comprises an optical dispersion compensation filter (ODC) 250 optically connected to the optical source 210, e.g. through the optical guide 220, in such a way as to be able to receive at an input port 258 the modulated optical signal emitted by the source 210. The optical filter is able to emit the filtered modulated optical signal at an output port 259 according to appropriate transfer functions (e.g. phase, dispersion and power transfer functions).

Included in the ODC optical filter 250, an optical path 255, e.g. in the form of an optical guide such as a planar optical guide (PLC), optically connects the input port to the output port.

It should be noted that the optical filter 250 can be inserted in any point of the optical path 130 of FIG. 1 between the transmitter 110 and the receiver 120.

The optical filter is a dispersive filter, i.e. able to induce a dispersion to the optical signal that traverses it. In one configuration, it is such that, in the spectral region of the optical source $P(\omega)$, the mean chromatic dispersion is not zero and of opposite value with respect to that of the optical fibre in the line 130.

Such filters can be constructed in integrated optics with various techniques and configurations, such as all-pass periodic filters obtained with a cascade of rings coupled to a rectilinear wave guide (as shown in FIG. 2), the periodic filters obtained with a cascade of unbalanced Mach-Zehnder interferometers, Gires-Tournois filters, interferometric filters with multiple resonating cavities, etc.

All these filters have a periodic dispersion transfer function with the frequency (where the period is known as free spectral range or FSR) and such that dispersion is substantially different from zero in a spectral region having a certain width, with more or less accentuated oscillations depending on the specific design.

With respect to dispersion compensation fibres, these components have among their advantages a higher dispersion to attenuation ratio and far lower costs and smaller size.

The optical filter 250 of FIG. 2 comprises a plurality of resonating cavities (or elementary resonators) 252, 254, 256, such as Bragg gratings or linear cavities, micro-rings, oval resonators (racetracks), and the like. Preferably, the resonators are arranged in cascade along the direction of propagation of the optical signal. In FIG. 2, for example, the micro-rings are cascade coupled to a wave guide 255 where the signal coming from the source or from the line transits. In the drawings, the symbol 256 consisting of three horizontally aligned dots represents an arbitrary number, including zero, of individual resonators. Preferably, the resonators 252, 254, 256 comprised in the filter 250 are two or three or four.

The filter of FIG. 2 is able to generate an optical transfer function that has frequency periodicity (Free Spectral Range) equal to $FSR=1/T$ where T is the time taken by the light to travel through the resonating cavity, e.g. the micro-ring.

In general, a single resonating optical cavity is characterized by corresponding 'resonating wavelengths' (and related 'resonance frequencies'), defined as those wavelengths an integer multiple whereof is equal to the optical length of the cavity of the resonator. The integer defines the order of the resonance. The distance between two adjacent resonance frequency is called the free spectral range (FSR) of the single resonator.

In accordance with the present invention, the optical filter 250 is tuneable, i.e. its transfer function can be translated along the frequency spectrum. This functionality can be obtained with any one of the prior art techniques, e.g. exploiting the thermo-optical, electro-optical, magneto-optical, acousto-optical and elasto-optical effect or by mechanical actuation (stress or MEMS).

As shown by way of example in FIG. 2, associated with the optical filter 250 there is a control system 260, 270, 280 operatively connected to the resonators of the optical filter in such a way as to tune said resonators in controlled fashion.

For example, the control system can comprise a control device 270 operatively coupled, e.g. by means of a connection line 280, to an actuator 260, which in turn is operatively coupled to the plurality of resonators of the optical filter. The control device 270 typically includes a processor (e.g. a microprocessor) configured to tune the ODC dispersive filter with respect to the optical signal according to the present invention. The control system can also include drive devices (not shown) suitable to drive the actuator 260.

Advantageously, a single actuator 260 is able to actuate all the resonators of the optical filter in unison, i.e. in equal and simultaneous fashion. For example, as shown in FIG. 2, if the tuning exploits the thermo-optical effect (particularly advantageous in the case of silicon wave guides) a heater 260 can be thermally coupled (e.g. positioned above the micro-rings, e.g. above the silica cladding of the silicon core of the wave guide) to the resonator complex, in such a way as to heat all the resonators in unison. Nevertheless, each individual resonator can have associated a respective additional dedicated actuator, to correct, resonator by resonator, any fabrication error and/or to give an appropriate shape to the response of the filter. For the purposes of the present invention, the control system 260, 270 and 280 is able rigidly to translate (i.e. without substantial change in shape) in the frequency spectrum the transfer function of the ODC filter 250.

The optical components described in the present description, such as the optical guides 220, 255 and the micro-rings 252, 254, 256, can be obtained from one of the prior art techniques in the field of integrated optics, e.g. a process of layering on a substrate, such as a Silicon-On-Insulator wafer with thickness of the intermediate oxide layer in the 3-10 micron range and of the upper silicon layer in the 50-1000 nm range. The layering process may include electron-beam and chemical etching lithography phases. A layer of $SiO_2$ can be deposited as upper cladding.

Figure 4A:
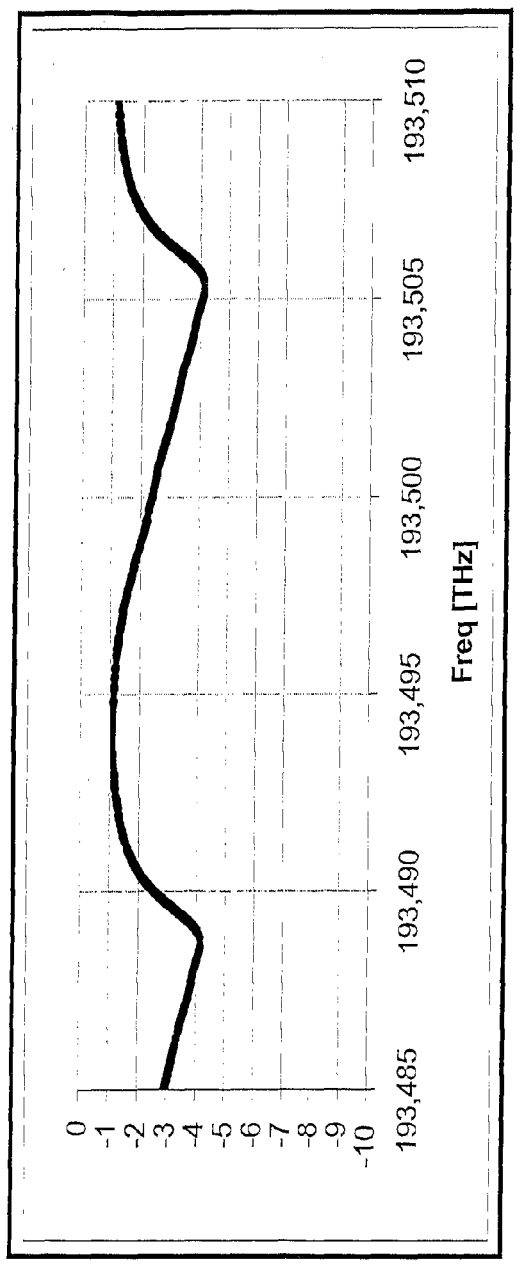
FIGS. 4A and 4B show an example of transfer function respectively in amplitude and in dispersion of a four-ring ODC filter according to the invention.
Figure 4B:
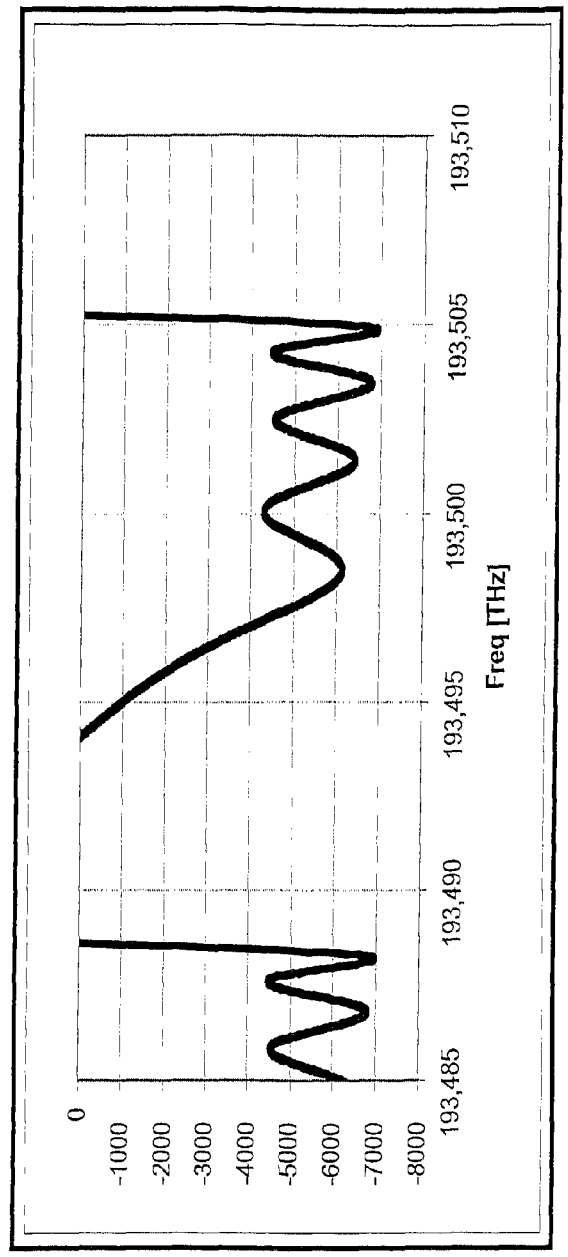

FIGS. 3A and 3B represent by way of example respectively the transmissivity (modulus of the power transfer function, in dB) and the chromatic dispersion (chromatic dispersion transfer function, in ps/nm) of a cascaded three-ring ODC filter (called ODC-3R). FIGS. 4A and 4B similarly show transmissivity and dispersion of a four-ring ODC filter ("ODC-4R"). All the ODCs used in the present description have a Free Spectral Range (FSR) of 16.5 GHz and a substantially flat transmissivity in the central region.

It should be noted that the non-constant profile of the modulus of the transfer function (FIGS. 3A and 4A) is a result of the non-zero attenuation of the wave guides (the attenuation cannot be completely eliminated under practical conditions) but it is not functional to the behaviour of the ODC, which would operate according to the invention even if the spectral attenuation were totally constant.

Figure 5:
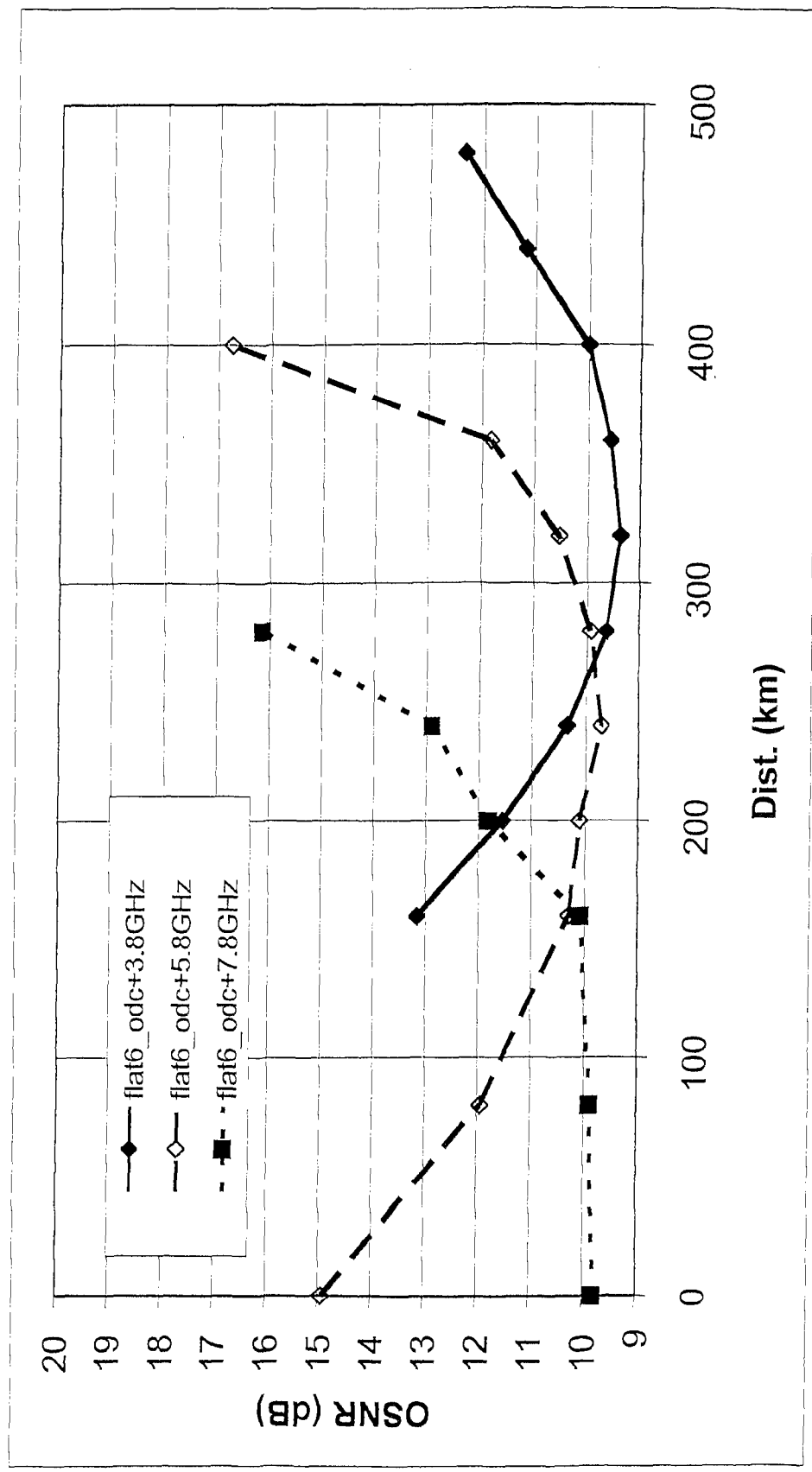
FIG. 5 shows the optical signal-to-noise ratio (OSNR) on 0.5 nm necessary to have a bit error rate (BER) of $10^{-6}$ for a filtered DML system combined with a three-ring ODC as in FIGS. 3A,B as a function of the length of the fibre (with dispersion 16 ps/nm*km) and for different values of detuning of the ODC filter.

FIG. 5 shows the penalty of the optical signal-to-noise ratio (OSNR) for a filtered DML system combined with an ODC-3R of the type shown in FIGS. 3A and B as a function of the transmission length in optical fibre of dispersion 16 ps/nm/km. The modulation format used in this simulation is the filtered DML. This format is obtained using a laser modulated directly with a variable current so that (as described above) the difference in frequency between the current of the "1" bits and that of the "0" bits is equal to half the bit-rate (e.g. 5 GHz for 10 Gbit/s). The laser is followed by an optical power filter (e.g. a resonating filter with double cavity with width 6.7 GHz and FSR 25 GHz) and appropriately centred at a different frequency from the mean emission frequency of the laser in such a way as to increase the extinction ratio of the outgoing signal and to optimize its spectral shape to obtain a high transmissive robustness to chromatic dispersion. This robustness, in the absence of additional compensators, is about 150 km on fibre with dispersion of 16 ps/nm*km. The continuous curve was obtained using the chromatic response of FIG. 3B (ODC-3R), with the wavelength of the laser tuned in such a way as to centre the region of maximum chromatic dispersion (non-shaded areas in FIG. 3B) to the transmission wavelength (i.e. in such a way that the mean chromatic dispersion on the spectrum of the signal is maximal in absolute value). As is readily apparent, the insertion of the ODC allows propagation of the signal for a distance of over 350 km with only 1 dB of penalty with respect to the back-to-back performance of the format (equal to 9 dB of OSNR). However, its performance degrades rapidly as distance decreases, exceeding 3 dB of penalty for distances below 150 km. In fact, when the value of the chromatic dispersion of the compensators approaches the value of dispersion robustness of the modulation format, the signal outputted by the compensator is degraded by intersymbolic interference and requires propagation in a dispersion medium with an opposite sign to recover its shape and hence present a small penalty to the receiver.

This behaviour would thus require, in the absence of the present invention, to select the compensator according to the line to be compensated, to avoid excessive penalties. In particular, it would not be possible to use compensators with high dispersion value on short lines. However this solution has the disadvantage of "specializing" transmission apparatuses and limits the possibility of reconfiguring the optical link without replacing the apparatuses.

One possibility for obtaining this variation in dispersion is to modify the parameters of the ODC filter (e.g. the optical coupling between wave guide 255 and each individual ring and/or the phase delay of each ring) in order to obtain reduced values of dispersion in the working spectral region. In this solution, alternative to the solution adopted in the present invention, the compensator is "reconfigured" modifying the shape of the spectral response in such a way as to have substantially constant chromatic dispersion in the operative spectral region of the signal but with a dispersion value that is different and corresponding (equal in absolute value and opposite in sign) to that of the line.

It is a consolidated prejudice in the art that a dispersion compensator filter (ODC) operates correctly when its dispersive characteristic is complementary to that of the fibre to be compensated. Since the chromatic dispersion of the fibre is substantially constant in the region of use (about 0.08 $ps/nm^2$ of slope), prior art filters are designed with a substantially flat operative region (trying to minimize its oscillations around the average value) and are not considered usable in the regions where their response in chromatic dispersion has a significant variation with frequency, such as the shaded regions of FIG. 3B. The Applicant has instead discovered that it is advantageous to use the aforesaid ODC filters in the spectral regions whereat the characteristic dispersion curve has an appreciable slope.

The advantage of this solution is that, as seen above, the rigid translation in frequency of the transfer function can be obtained acting on a single control variable, making the control algorithm simpler, faster and more reliable.

FIG. 5 also shows (dashed line and dotted line) the OSNR penalty as a function of transmission length for two different values (respectively +2 and +4 GHz) of detuning of the ODC with respect to the position corresponding to the continuous curve. The term "detuning" of the ODC filter means the displacement in frequency of the dispersive characteristic of the ODC, with respect to a reference value, obtained by rigidly translating its characteristic with the techniques described above (for example, one can take as a reference the position of the dispersion curve of the filter for which the central wavelength of the optical transmitter coincides with that of the maximum value, in modulus, of dispersion). A series of numerical simulations were conducted, making the working point of the ODC vary by translating its characteristic in frequency and maintaining its shape unchanged. Moreover, the fibre length of the system was varied as shown in FIG. 5. The tests performed showed that, when the characteristic of the filter is moved, the filter behaves substantially as if a dispersion compensating fibre, with variable dispersion, proportional to the dispersion of the work point, were introduced into the system. This remains valid even where the dispersion of the ODC varies by a considerable extent within the spectral region corresponding to the spectrum of the optical signal emitted by the optical source 210 (i.e. the slope of the dispersion curve is not zero and may assume high values). Therefore, it is possible to tune the ODC filter even in spectral regions (within its FSR) where the mean value of the dispersion is lower and hence better usable on short distance lines even if the chromatic dispersion of the filter in said regions is strongly variable within the spectral region of the optical signal to be compensated and would therefore not be considered usable according to the state of the art.

The result of these tests was that the ODC has low penalties (with a performance that, with fairly good approximation, is equivalent to that of a compensating fibre with dispersion equal to the mean dispersion value of the ODC weighted over the spectrum of the transmitted signal) even at the spectral regions in which the characteristic dispersion curve has an appreciable slope. This result was unexpected because, as stated above, the design rule for these equalizers is to minimize deviations from the constant profile. This unexpected behaviour led the Applicant to suppose that the ODC may operate with low penalties even in spectral regions not designed to approximate the constant profile of dispersion. The Applicant has observed that, even in spectral regions where chromatic dispersion varies significantly with frequency (within the signal spectrum), the ODC can behave, at the propagation penalty level, as a dispersion equalizer with flat dispersion.

As shown in FIG. 5 (dashed and dotted curves), a limited detuning (respectively +2 and +4 GHz) with respect to a tuned position of the filter corresponding to high dispersion has shown a displacement of the penalty curve as a function of length that is equivalent to the one that would have occurred if a variable compensator with its dispersion flat in frequency had been introduced.

The simulations show that for a filter DML system it is possible to obtain a transmission with penalty within 1 dB for all distances between 0 km and the maximum distance allowed by the dispersion compensated by ODC (about 350 km in the previous example) by slightly varying (by 4 GHz in the previous example) the position in the frequency spectrum of the response in dispersion of the ODC with respect to the transmission wavelength of the optical signal source 210.

To confirm this result, additional simulations were conducted using an ODC able to compensate yet a greater chromatic dispersion (ODC-4R as in FIGS. 4A,B).

Figure 6:
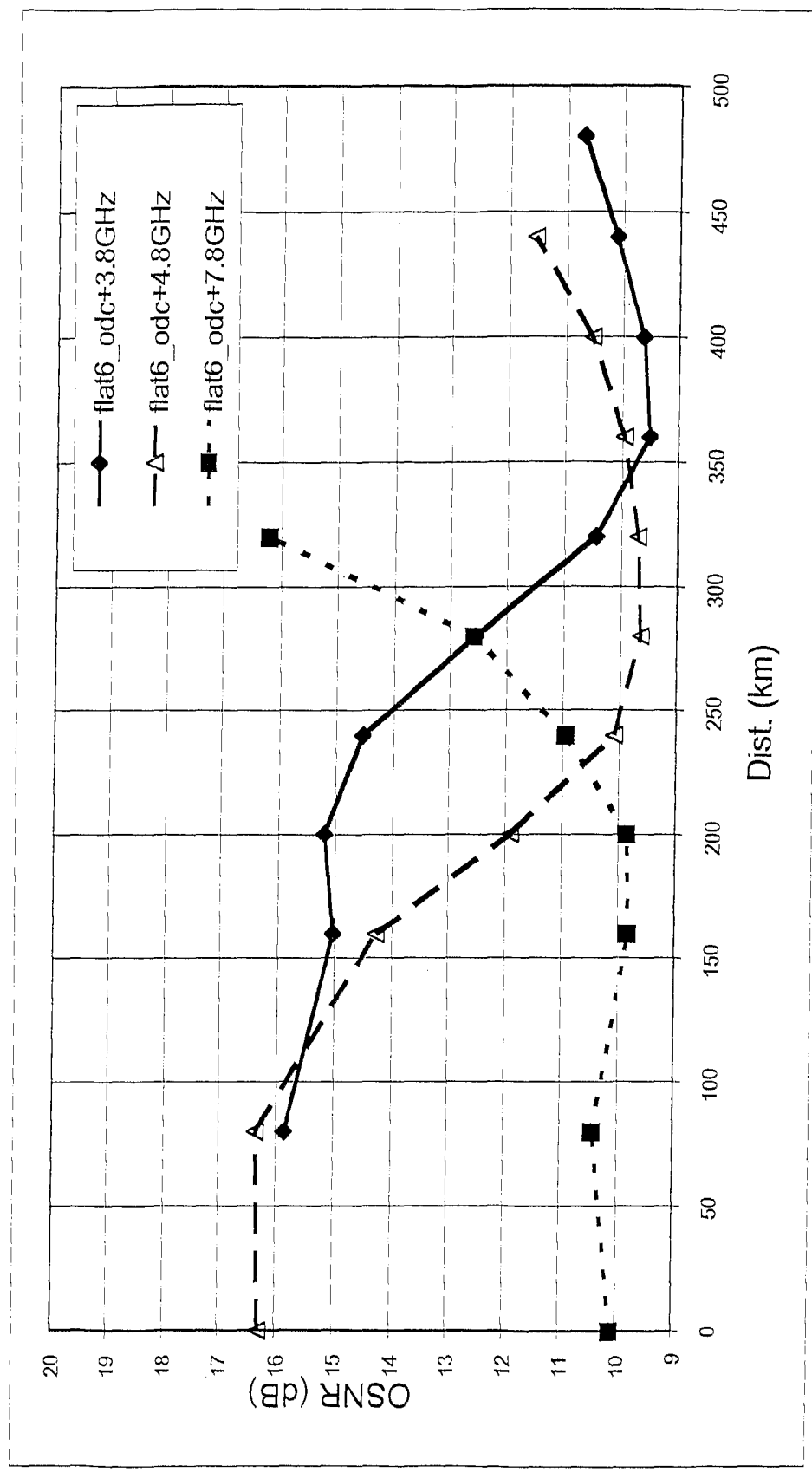
FIG. 6 shows the optical signal-to-noise ratio (OSNR) on 0.5 nm necessary to have a bit error rate (BER) of $10^{-6}$ for a filtered DML system combined with a four-ring ODC as in FIGS. 4A,B as a function of the length of the fibre (with dispersion 16 ps/nm*km) and for different values of detuning of the ODC filter.

FIG. 6 shows the OSNR penalty resulting from numerical simulations for a filtered DML system followed by an ODC-4R as a function of the transmission length for three different tuning values (i.e. position of the dispersion response of the filter with respect to the optical signal) of the ODC. Since an ODC that could allow for compensation of a high chromatic dispersion was sought, an ODC like the one in FIG. 4A,B (ODC-4R) was chosen, which has a maximum point value of about −5500 ps/nm. The continuous curve shows the profile of the system penalty with the ODC-4R centred on a value proximate to the maximum value of mean dispersion, whilst the other curves show the penalty as detuning changes. These results show that, in this case as well, it is possible to obtain a substantially constant penalty (<1.5 dB) for line lengths between 0 and 450 km with less than 5 GHz detuning of the ODC.

The result of these tests was that the ODC still has low penalties (dashed and dotted line of FIG. 6, corresponding respectively to detuning of +2 and +4 GHz relative to the case of the continuous curve). The performance, with fairly good approximation, is equivalent to that of a compensating fibre with dispersion equal to the mean value of dispersion of the ODC weighted over the spectrum of the transmitted signal. This result was unexpected because, as stated above, the design rule for these equalizers is to minimize deviations from the constant profile.

The Applicant then observed that ODC filters behave substantially as "equivalent compensating fibres" having the dispersion parameters linked to those of the ODC around the work point. Moreover, the Applicant found that, as characteristic values of the filter, it is advantageous to consider not its punctual dispersion but a mean dispersion weighted over the spectrum of the signal.

In rigorous terms, considering a single-pole all-pass filter comprising a cascade of at least two resonating elementary filters (e.g. micro-ring or etalon with a completely reflecting face), its transfer function can be expressed as:

$$T(\omega - \varpi) = A(\omega - \varpi)\exp(i * \vartheta(\omega - \varpi))$$

$$\tau(\omega - \varpi)\frac{d\vartheta}{d\omega}$$

$$\beta_2(\omega - \varpi) = \frac{d\tau}{d\omega}$$

where $A(\omega)$ is a function slowly variable with frequency (nearly constant as a first approximation), $\theta(\omega)$ is the phase variation induced by the filter as a function of optical frequency and it is characterized by a value of FSR, $\tau(\omega)$ is the group delay induced by the filter and $\beta_2(\omega)$ is the dispersion induced by the filter.

The frequency $\overline{\omega}$ is a tuneable parameter (having the magnitude of the optical frequency) of the ODC filter which makes the characteristic of the filter slide rigidly along the axis of the frequencies without altering its relative shape. This parameter can be varied for example by actuating the actuator 260 controlled by the device 270.

Considering an optical signal (emitted by the source 210) characterized by an optical spectrum $P(\omega)$, the following parameters are defined:

$$S_0(\varpi) = \frac{\int P(\omega) * \beta_2(\omega - \varpi) d\omega}{\int P(\omega) d\omega}$$

$$S_1(\varpi) = \frac{\int P(\omega) * \frac{d\beta_2(\omega - \varpi)}{d\omega} d\omega}{\int P(\omega) d\omega}$$

$$S_2(\varpi) = \frac{\int P(\omega) * \frac{d^2\beta_2(\omega - \varpi)}{d\omega^2} d\omega}{\int P(\omega) d\omega}$$

where $S_0$ is the mean chromatic dispersion weighted over the optical spectrum (effective dispersion) and $S_1$ and $S_2$ are the mean values weighted over the optical spectrum of its first derivative (effective slope of the dispersion) and second derivative.

The value of $S_0$ is the chromatic dispersion value the ODC filter is able to compensate effectively whilst the value of $S_1$ is the representative value of the deviation of the punctual dispersion of the filter from a mean value within the spectral width of the signal. The Applicant's system evaluations have enabled it to be established that the ODC filter, contrary to what was believed in the art, can reach even very high levels before the filter starts to have propagation penalties produced by said punctual dispersion variations.

Figure 7A:
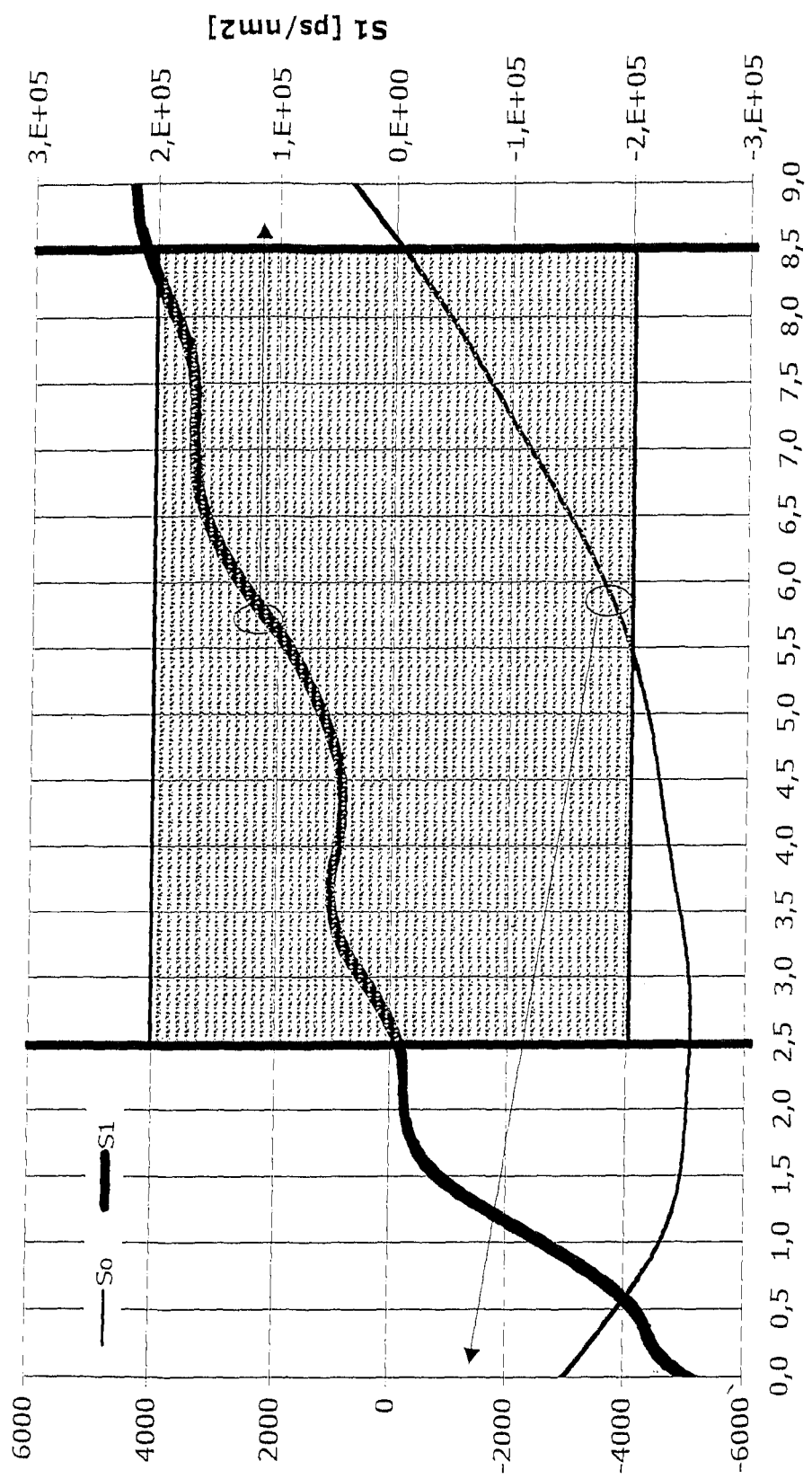
FIGS. 7A,B show the exemplary values of the parameters $S_0$, $S_1$ and $S_2$ according to the invention for the four-ring ODC filter as in FIGS. 4A,B and filtered DML transmission system.
Figure 7B:
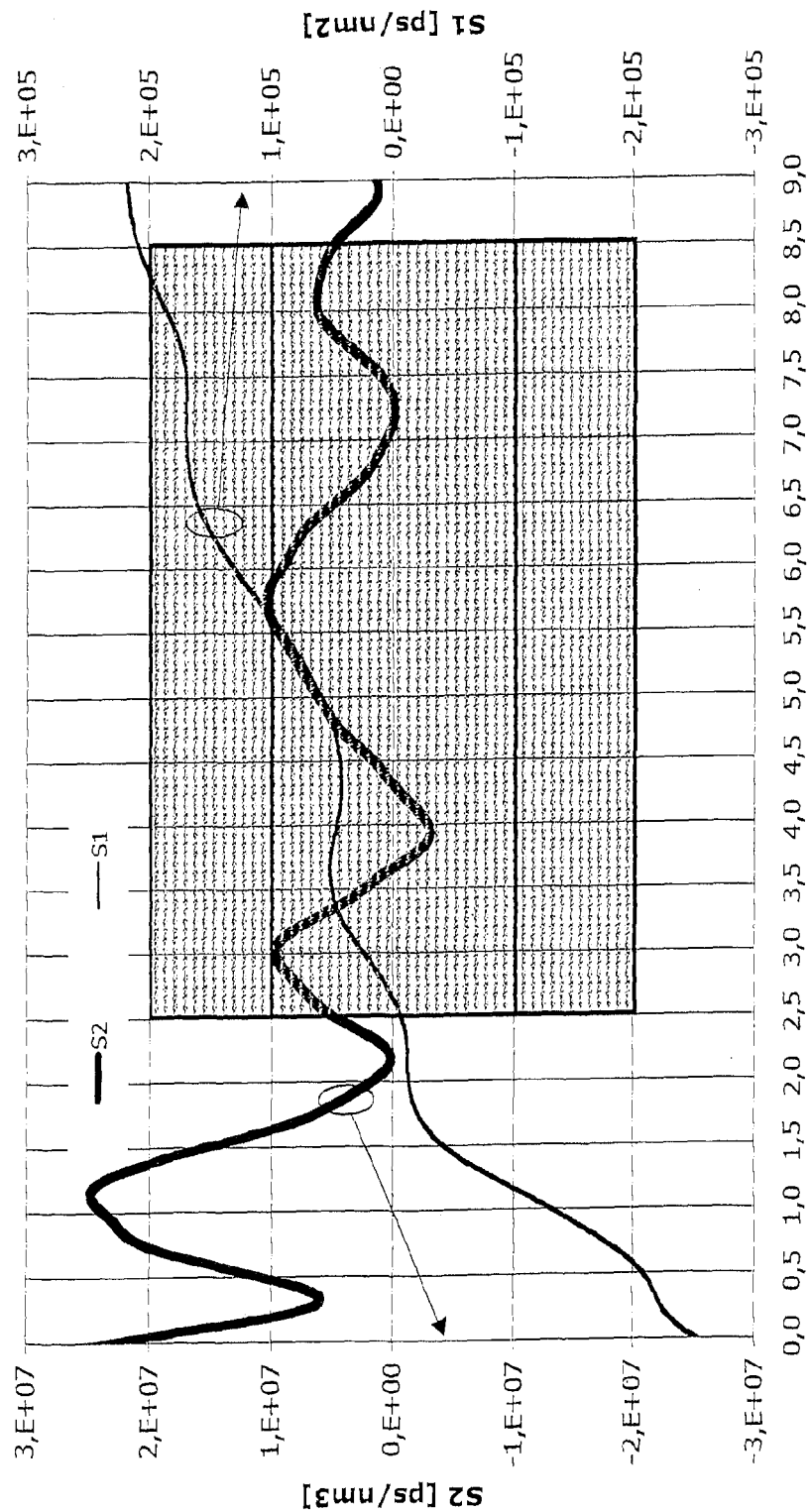

FIGS. 7A and B show the values of the parameters defined above for the 4 micro-ring filter of the example of FIGS. 4A,4B with the same signal of DML format filter used in the example of FIG. 6. FIG. 7A shows the values of the parameters $S_0$ and $S_1$ for the ODC 4R and FIG. 7B shows the values of the parameters $S_1$ and $S_2$.

As can be seen from the comparison between FIG. 6 and FIGS. 7A and B, the maximum propagation distances are achieved for a tuning of the ODC filter on the values corresponding to effective dispersion that are greater in absolute value (smaller, if the sign is considered). The maximum value of $S_0$ in absolute value corresponds in FIG. 7A to the detuning value of about 2.5 GHz (evaluated with respect to an arbitrary reference frequency), and it is identified in the figure by a vertical line. Short distance performance becomes acceptable for effective dispersion values that are low in absolute value or around zero. The effective dispersion value equal to zero corresponds in FIG. 7A to a detuning value of about 8.5 GHz, identified by a second vertical line.

The parameters $S_1$ and $S_2$ that continue to allow an operation with low penalties of the system have been evaluated, by means of simulations, to values equal respectively to about 200000 ps/nm$^2$ for $S_1$ and about 10000000 ps/nm$^3$ for $S_2$, showing that the filters are usable also in regions where dispersion varies at a high level with frequency. For comparison purposes, for example, the value of $S_1$ for a standard optical fibre with length of 100 km is about 8 ps/nm$^2$. The Applicant has therefore determined that surprisingly it is possible usefully to compensate dispersion in a transmission system according to the invention in the presence of dispersion slope within the useful bandwidth of the transmitted optical signal that is greater by as many as four orders of magnitude than the corresponding value of a typical segment of transmission optical fibre of medium length. A similar consideration holds true for the parameter $S_2$: the acceptable values of $S_2$ in the filter according to the invention are far greater than the typical values of the same parameter for optical fibre communication lines.

Comparison of FIGS. 6 and 7A,B shows how, in the case of the filtered DML format, it is possible to transmit the signal with small penalties over a broad interval of distances with values of the mean slope $S_1$ of the dispersion of the dispersive filter up to about 200000 ps/nm$^2$ in absolute value. Typically, the values of $S_1$ are greater than 1000 ps/nm$^2$ in absolute value for tuning positions of the filter corresponding to the lower values of dispersion in absolute value. Typically, the values of $S_2$ can assume values up to $10^7$ ps/nm$^3$ in absolute value without significant contributions to the penalty.

The Applicant has determined that acceptable performance in terms of penalty can be obtained for values of the mean slope $S_1$ of the dispersion of the dispersive filter up to about 300000 ps/nm$^2$ in absolute value.

In order to improve the performance of the filter, however, it is always useful to mutually detune the resonance frequencies of the individual elements of the filter, to generate a dissymmetry in the characteristic of the filter which makes the values of $S_1$ and $S_2$ smaller than the critical values in the region where $S_1$ reaches the greatest values (in absolute terms).

As further confirmation of the evaluations made above, the same ODC-4R was used with a different modulation format. The chosen format was the duobinary format.

Figure 8:
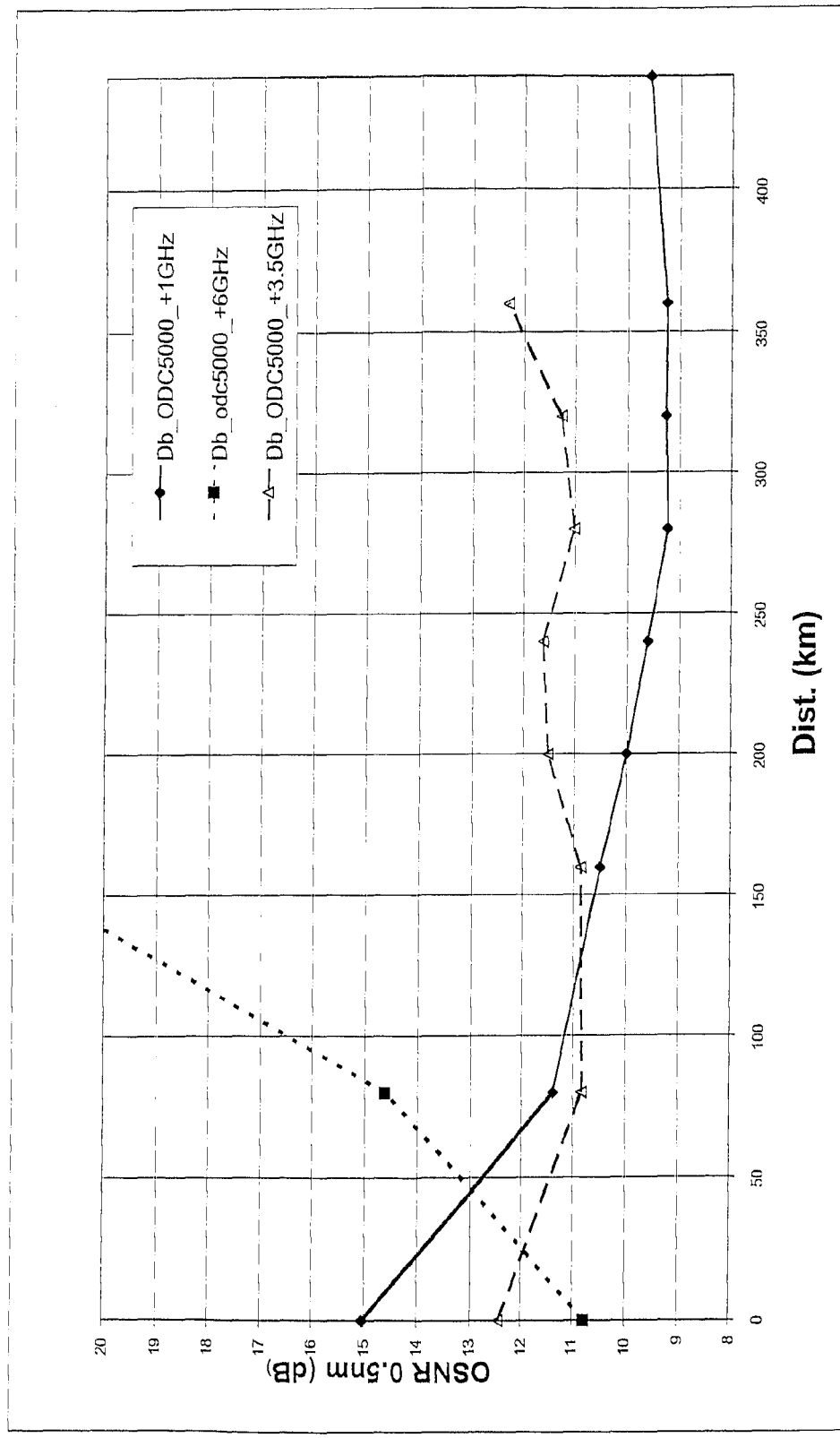
FIG. 8 shows the OSNR on 0.5 nm necessary to have a BER of $10^{-6}$ for a duobinary system combined with a four-ring ODC as in FIGS. 4A,B as a function of the length of the fibre (dispersion 16 ps/nm*km) and for different values of detuning of the ODC filter.

FIG. 8 shows the result of the propagation simulations of this format as a function of ODC tuning and it shows that with this modulation format as well it is possible to find tuning values of the filter for which the duobinary signal can be transmitted with small penalties between 0 and over 450 km.

Figure 9A:
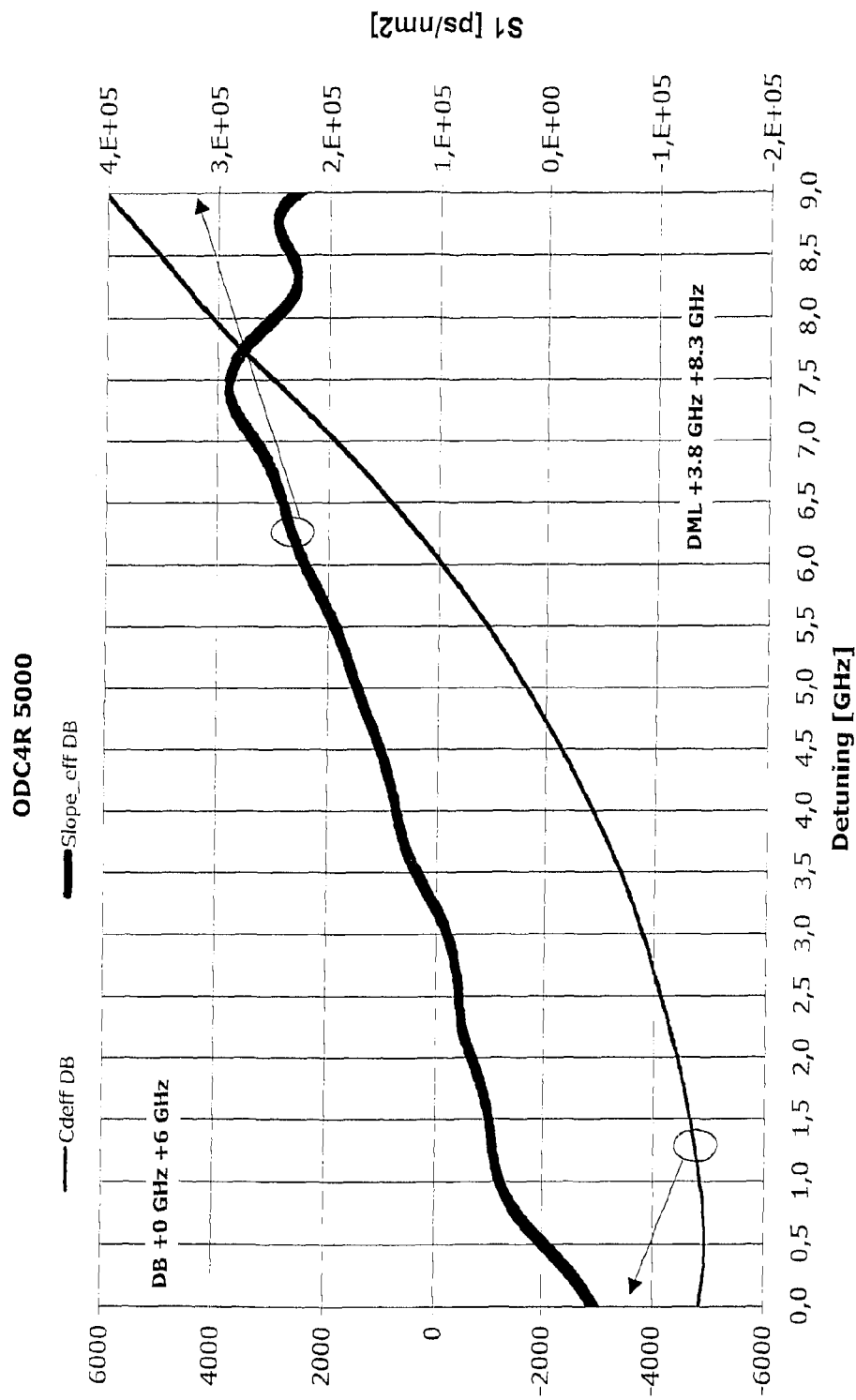
FIGS. 9A,B show the exemplary values of the parameters $S_0$, $S_1$ and $S_2$ according to the invention for the four-ring ODC filter as in FIGS. 4A,B and duobinary transmission system.
Figure 9B:
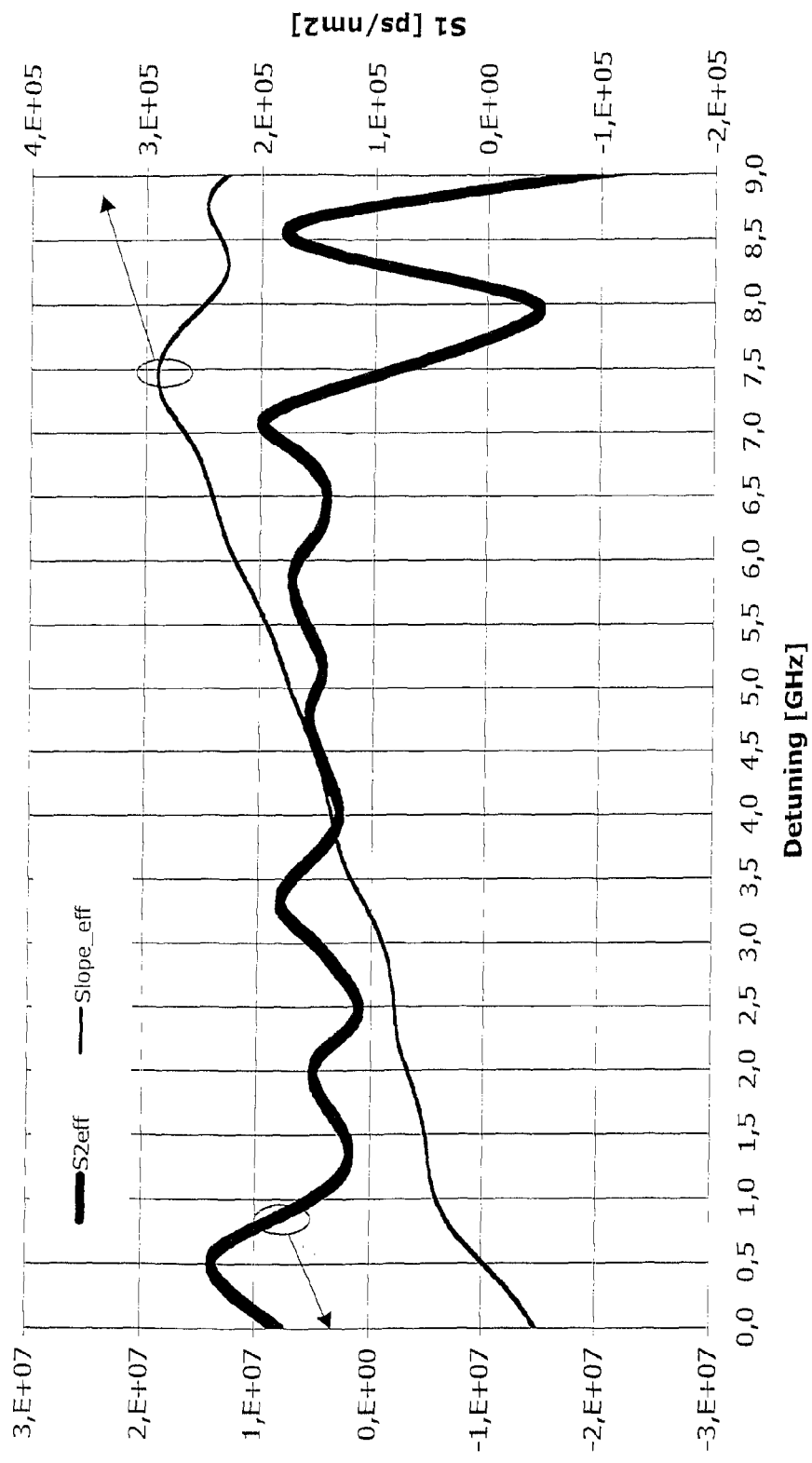

FIGS. 9A and B show the values of $S_0$, $S_1$ and $S_2$ obtained for the duobinary modulation format (the ODC filter is the same as in the previous case of FIGS. 7A,B but the signal spectrum changes).

Comparison of FIGS. 8 and 9A,B shows that in the case of the duobinary format as well it is possible to transmit the signal with small penalties on a broad range of distances with values of the mean slope $S_1$ of the dispersion of the dispersive filter up to about 200000 ps/nm$^2$ in absolute value. Typically, the values of $S_1$ are higher than 1000 ps/nm$^2$ in absolute value for tuning positions of the filter corresponding to lower values of dispersion in absolute value. Typically, the values of $S_2$ can reach up to $10^7$ ps/nm$^3$ in absolute value without significant contributions to the penalty.

In this case as well, the Applicant has determined that acceptable performance levels can be obtained in terms of penalties for values of the mean slope $S_1$ of the dispersion of the dispersive filter up to about 300000 ps/nm$^2$ in absolute value.

In one embodiment, the present invention provides a transmission system 200 comprising:
Source 210 of optical signal modulated with any format;
Dispersive filter ODC 250 characterized by:
  at least two elementary resonators (typically single-pole resonators, e.g. micro-rings or etalon) not all resonating at the same frequency;
  $S_0$ variable between an absolute value and zero in a frequency range $\Delta v$ contained in its FSR;
  $S_1 < X$ (X is a first predetermined value) throughout the spectral region $\Delta v$ and
  $S_2 < Y$ (Y is a second predetermined value) throughout the spectral region $\Delta v$.

Said system being able to operate at 10 Gb/s with limited penalty, substantially constant on lines with dispersion between 0 and a value of chromatic dispersion exceeding the one related to the intrinsic dispersive robustness of the format (maximum dispersion value of the line for which the signal propagates with small penalty in the absence of other means for compensating the chromatic dispersion of the line) and preferably with a value that is at least double said robustness. Said operation being achieved in adaptive fashion simply translating the ODC in frequency without modifying its shape.

Said system therefore has the advantage that it can be reconfigured, to be adapted to different values of dispersion of the optical line, simply by moving it rigidly in frequency (which can be obtained simply by changing the tuning of the entire filter, e.g. by changing its temperature) without complicated controls or configurations able to modify its shape to adapt it to the dispersion of the line.

The configuration of the ODC can be commanded both by the network supervisor who, through a simple algorithm, can determine the value on the basis of the length of the link to be activated and send a software command to the transponder comprising the optical source and the dispersion compensation filter, and by an automatic control which optimizes a transmission quality parameter.

By way of example, it would be possible to use the measurement of the bit error rate at the output of an FEC (Forward Error Correction code) circuit to obtain the feedback signal to be used to control tuning.

The values X and Y depend on the coding of the signal.

The value of X will be evaluated considering an ideal filter with transfer function:

$$T(\omega) = \exp(i * X * \omega^3)$$

(corresponding to an ideal filter with zero dispersion but with a finite dispersion slope) and defining X as the value for which the signal filtered by said filter will have a significant penalty (1.5-2 dB) with respect to the unfiltered case.

Similarly, the value of Y will be defined as that value for which an ideal filter $$T(\omega)=\exp(i*Y*\omega^4)$$

(corresponding to an ideal filter with zero dispersion and dispersion slope but with a finite variation of the dispersion slope) will instead have a penalty of less than about 1.5 dB.

The duobinary and filtered DML formats correspond to filters usable with the technique of the present invention, similar to each other (because their signal spectra are similar) whereas a lower number of filters will be acceptable for the NRZ format (which has a larger signal spectrum).

For example for the optically filtered DML format, said values are $X=2*10^5$ ps/nm$^2$ and $Y=1*10^7$ ps/nm$^3$.

This criterion also enables the design of ODC filters in such a way as to maximize the value of $S_0$ with the only constraint of maintaining the values of $S_1$ and preferably $S_2$ lower than the limits indicated above and to keep them so throughout a spectral region where the value of $S_0$ will vary between its maximum value and a value lower than the robustness of the format (e.g., zero).

In this way, the filter designer and the system designer will be provided with a simple manner of evaluating the performance which the filter designed by him/her will yield if used together with a determined transmission system (modulation format).

The invention claimed is:

1. An optical transmission system comprising:
an optical source generating a modulated optical signal having an optical spectrum and a value of dispersion robustness;
an optical dispersion compensation filter optically connected to the optical source, the optical dispersion compensation filter comprising at least two cascaded optical resonators and having a periodic transfer function rigidly translatable in the frequency spectrum to obtain translation in frequency of the transfer function without a substantial change in shape, and characterized by a free spectral range;
a control system acting on the optical dispersion compensation filter for rigidly translating the transfer function along the frequency spectrum in first and second positions in the frequency spectrum, wherein:
in the first position in the frequency spectrum of the transfer function, a mean chromatic dispersion weighted over the optical spectrum of the modulated signal is greater, in absolute value, than the value of dispersion robustness and a mean slope of the chromatic dispersion weighted on the optical spectrum of the modulated signal is smaller, in absolute value, than 300000 ps/nm$^2$;
in the second position in the frequency spectrum of the transfer function, the mean chromatic dispersion weighted over the optical spectrum of the modulated signal is smaller, in absolute value, than the value of dispersion robustness and mean slope of the chromatic dispersion weighted on the optical spectrum of the modulated signal is smaller, in absolute value, than 300000 ps/nm$^2$; and
wherein translation of the transfer function between the first and second positions is smaller than the free spectral range.

2. The optical transmission system of claim 1, wherein in the second position, the mean slope of the chromatic dispersion weighted over the optical spectrum of the modulated signal is greater than 1000 ps/nm$^2$.

3. The optical transmission system of claim 1, wherein the optical filter for compensating dispersion comprises at least two optical resonators, not all resonating at the same frequency.

4. The optical transmission system of claim 1 wherein:
the optical source generates a modulated optical signal having an optical spectrum $P(\omega)$ where $\omega$ is the optical frequency;
the transfer function of the optical compensation filter is such that its chromatic dispersion is expressed by the function $\beta_2(\omega-\overline{\omega})$, $\overline{\omega}$ being a tuneable parameter of the filter, such that:
the function $$S_0(\varpi) = \frac{\int P(\omega)*\beta_2(\omega-\varpi)d\omega}{\int P(\omega)d\omega}$$

varies in absolute value with an excursion greater than 1000 ps/nm as $\overline{\omega}$ changes within a frequency interval $\Delta\nu$ that is smaller than the free spectral range; and
the function $$S_1(\varpi) = \frac{\int P(\omega)*\frac{d\beta_2(\omega-\varpi)}{d\omega}d\omega}{\int P(\omega)d\omega}$$

remains in absolute value below a predetermined quantity X as $\overline{\omega}$ changes in the spectral region $\Delta\nu$.

5. The optical transmission system of claim 4, wherein the function $$S_2=(\varpi) = \frac{\int P(\omega)*\frac{d^2\beta_2(\omega-\varpi)}{d\omega^2}d\omega}{\int P(\omega)d\omega}$$

remains in absolute value below a predetermined quantity Y as $\overline{\omega}$ changes in the spectral region $\Delta\nu$.

6. The optical transmission system of claim 4, wherein the quantity X is evaluated considering an ideal filter with transfer function: $T(\omega)=\exp(i*X*\omega^3)$ and defining X as the value for which the signal filtered by the filter will have a significant penalty with respect to the unfiltered case.

7. The optical transmission system of claim 5, wherein the quantity Y is defined as the value for which an ideal filter $T(\omega)=\exp(i*Y*\omega^4)$ has a penalty lower than about 1 dB.

8. The optical transmission system of claim 1, wherein the optical resonators are micro-rings or etalons.

9. An optical telecommunication system comprising:
an optical transmission system comprising:
an optical source generating a modulated optical signal having an optical spectrum and a value of dispersion robustness;
an optical dispersion compensation filter optically connected to the optical source, the optical dispersion compensation filter comprising at least two cascaded optical resonators and having a periodic transfer function rigidly translatable in the frequency spectrum to obtain translation in frequency of the transfer function without a substantial change in shape, and characterized by a free spectral range;

a control system acting on the optical dispersion compensation filter for rigidly translating the transfer function along the frequency spectrum in first and second positions in the frequency spectrum, wherein:

in the first position in the frequency spectrum of the transfer function, a mean chromatic dispersion weighted over the optical spectrum of the modulated signal is greater, in absolute value, than the value of dispersion robustness and a mean slope of the chromatic dispersion weighted on the optical spectrum of the modulated signal is smaller, in absolute value, than 300000 ps/nm²;

in the second position in the frequency spectrum of the transfer function, the mean chromatic dispersion weighted over the optical spectrum of the modulated signal is smaller, in absolute value, than the value of dispersion robustness and the mean slope of the chromatic dispersion weighted on the optical spectrum of the modulated signal is smaller, in absolute value, than 300000 ps/nm²; and wherein translation of the transfer function between the first and second positions is smaller than the free spectral range;

a transmission system;

a receiver; and an optical line optically connecting the transmission system to the receiver.

10. A method for transmitting a modulated optical signal having an optical spectrum and a value of dispersion robustness along an optical line characterized by a dispersion, the method comprising:

generating the modulated optical signal;

rigidly translating a periodic transfer function, characterized by a free spectral range, along a frequency spectrum in first and second positions to obtain translation in frequency of the transfer function without a substantial change in shape, wherein:

in the first position in the frequency spectrum of the transfer function, a mean chromatic dispersion weighted over the optical spectrum of the modulated signal is greater, in absolute value, than the value of dispersion robustness and a mean slope of the chromatic dispersion weighted on the optical spectrum of the modulated signal is smaller, in absolute value, than 300000 ps/nm²;

in the second position in the frequency spectrum of the transfer function, the mean chromatic dispersion weighted over the optical spectrum of the modulated signal is smaller, in absolute value, than the value of dispersion robustness and the mean slope of the chromatic dispersion weighted on the optical spectrum of the modulated signal is smaller, in absolute value, than 300000 ps/nm²; and the translation of the transfer function between the first and second positions is smaller than the free spectral range;

choosing one of the first and second positions of the frequency spectrum according to the values of dispersion robustness of the modulated optical signal and of the dispersion of the optical line; and tuning the filter in one of the first and second positions according to the choice.

11. The method of claim 10, wherein in the second position the mean slope of the chromatic dispersion weighted over the optical spectrum of the modulated signal is greater than 1000 ps/nm².

12. The method of claim 10, wherein the optical filter for compensating dispersion comprises at least two optical resonators, not all resonating at the same frequency.

13. The method of claim 10, wherein:

the optical source generates a modulated optical signal having an optical spectrum $P(\omega)$ where $\omega$ is the optical frequency;

the transfer function of the optical compensation filter is such that its chromatic dispersion is expressed by the function $\beta_2(\omega-\overline{\omega})$, $\overline{\omega}$ being a tuneable parameter of the filter, such that:

the function $$S_0(\varpi) = \frac{\int P(\omega) * \beta_2(\omega - \varpi) d\omega}{\int P(\omega) d\omega}$$

varies in absolute value with an excursion greater than 1000 ps/nm as $\overline{\omega}$ changes within a frequency interval $\Delta\nu$ that is smaller than the free spectral range; and the function $$S_1(\varpi) = \frac{\int P(\omega) * \frac{d\beta_2(\omega - \varpi)}{d\omega} d\omega}{\int P(\omega) d\omega}$$

remains in absolute value below a predetermined quantity X as $\overline{\omega}$ changes in the spectral region $\Delta\nu$.

14. The method of claim 13, wherein the function $$S_2(\varpi) = \frac{\int P(\omega) * \frac{d^2 \beta_2(\omega - \varpi)}{d\omega^2} d\omega}{\int P(\omega) d\omega}$$

remains in absolute value below a predetermined quantity Y as $\overline{\omega}$ changes in the spectral region $\Delta\nu$.

15. The method of claim 13, wherein the quantity X is evaluated considering an ideal filter with transfer function: $T(\omega)=\exp(i*X*\omega^3)$ and defining X as the value for which the signal filtered by the filter will have a significant penalty with respect to the unfiltered case.

16. The method of claim 13, wherein the quantity Y is defined as the value for which an ideal filter $T(\omega)=\exp(i*Y*\omega^4)$ has a penalty lower than about 1 dB.

17. The method of claim 10, wherein the optical resonators are micro-rings or etalons.

18. The method of claim 11, wherein:

the optical source generates a modulated optical signal having an optical spectrum $P(\omega)$ where $\omega$ is the optical frequency;

the transfer function of the optical compensation filter is such that its chromatic dispersion is expressed by the function $\beta_2(\omega-\overline{\omega})$, $\overline{\omega}$ being a tuneable parameter of the filter, such that:

the function $$S_0(\varpi) = \frac{\int P(\omega) * \beta_2(\omega - \varpi) d\omega}{\int P(\omega) d\omega}$$

varies in absolute value with an excursion greater than 1000 ps/nm as $\overline{\omega}$ changes within a frequency interval $\Delta v$ that is smaller than the free spectral range; and
the function $$S_1(\varpi) = \frac{\int P(\omega) * \frac{d\beta_2(\omega - \varpi)}{d\omega} d\omega}{\int P(\omega) d\omega}$$

remains in absolute value below a predetermined quantity X as $\overline{\omega}$ changes in the spectral region $\Delta v$.

19. The optical transmission system of claim 2 wherein the optical filter for compensating dispersion comprises at least two optical resonators, not all resonating at the same frequency.

20. The optical transmission system of claim 2 wherein:
the optical source generating a modulated optical signal having an optical spectrum $P(\omega)$ where $\omega$ is the optical frequency:
the transfer function of the optical compensation filter having the chromatic dispersion expressed by the function $\beta_2(\omega - \overline{\omega})$ being a tuneable parameter of the filter, such that:
the function $$S_1(\varpi) = \frac{\int P(\omega) * \frac{d\beta_2(\omega - \varpi)}{d\omega} d\omega}{\int P(\omega) d\omega}$$

various in absolute value with an excursion greater than 1000 ps/nm as m changes within a frequency interval $\overline{\omega}$ that is smaller than the free spectral range; and
the function $$S_1(\varpi) = \frac{\int P(\omega) * \frac{d\beta_2(\omega - \varpi)}{d\omega} d\omega}{\int P(\omega) d\omega}$$

remains in absolute value below a predetermined quantity X as $\overline{\omega}$ changes in the spectral region $\Delta v$.

\* \* \* \* \*